United States Patent
Boltz, Jr.

[15] 3,679,827
[45] July 25, 1972

[54] OPTICAL APPARATUS FOR CONTINUOUS TELEVISION FILM PROJECTION SYSTEM

[72] Inventor: Charles D. Boltz, Jr., Greenwood, Ind.
[73] Assignee: RCA Corporation
[22] Filed: March 2, 1971
[21] Appl. No.: 120,075

[52] U.S. Cl. ......................... 178/7.2, 178/DIG. 28, 352/105
[51] Int. Cl. ..................................... H04n 1/04, G03b 41/02
[58] Field of Search ........................ 178/6.7 A, 7.2, DIG. 28; 352/105, 106, 107, 108, 109, 110, 111, 112

[56] References Cited

UNITED STATES PATENTS 3,584,148  6/1971  Flory..............................178/DIG. 28

Primary Examiner—Robert L. Griffin
Assistant Examiner—George G. Stellar
Attorney—Eugene M. Whitacre

[57] ABSTRACT

Two partially light transmissive and partially light reflective light-forwarding devices in the main optical path between the film and a camera tube are rotated so that a light replica of a film frame is transmitted through the devices when the frame is in the center of the film gate and other light replicas are reflected from one device to the other by way of stationary reflectors on opposite sides of the main optical path and thence to the camera tube when the frame has just completely entered and is about to leave the gate, respectively.

10 Claims, 5 Drawing Figures

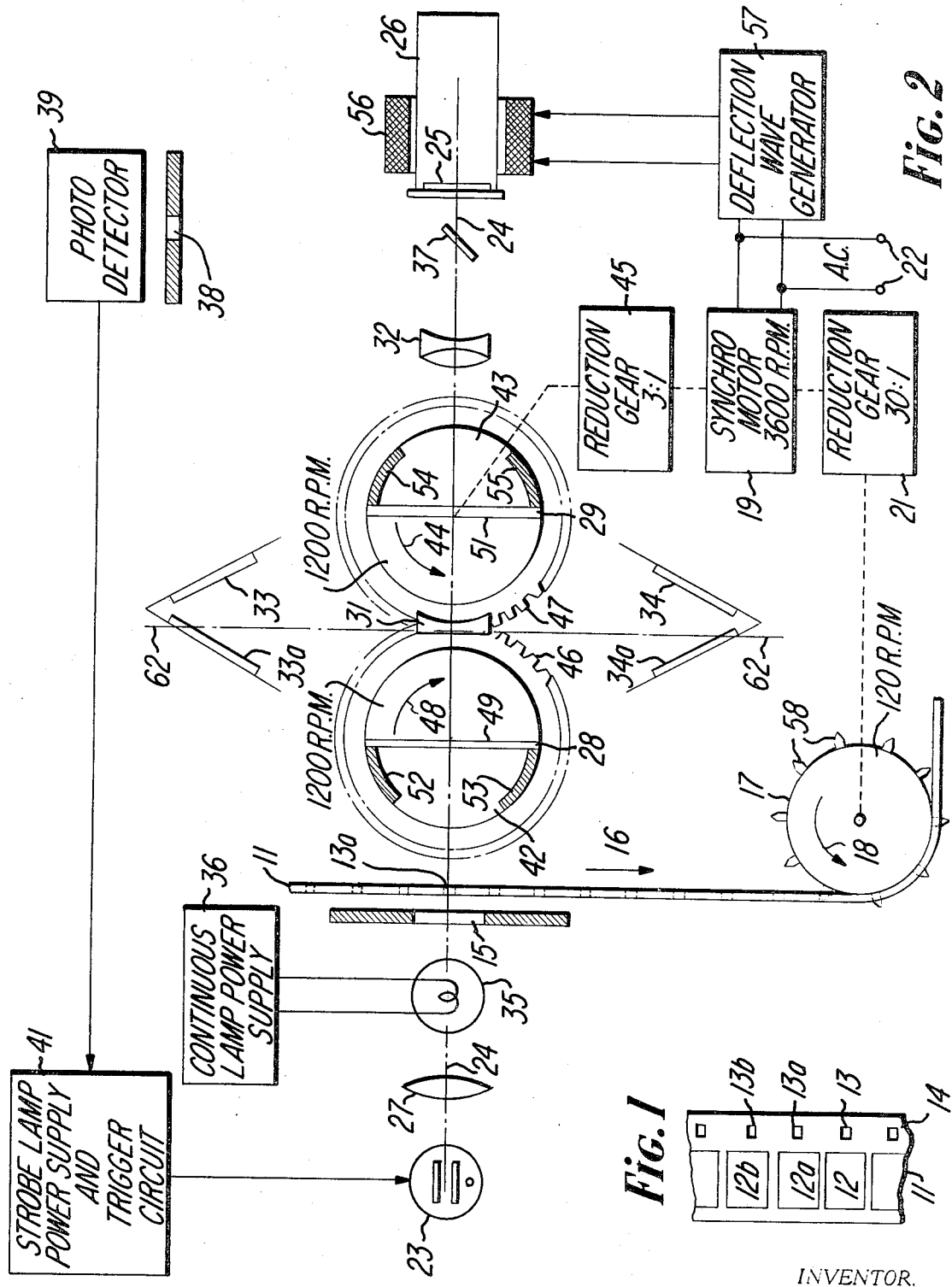

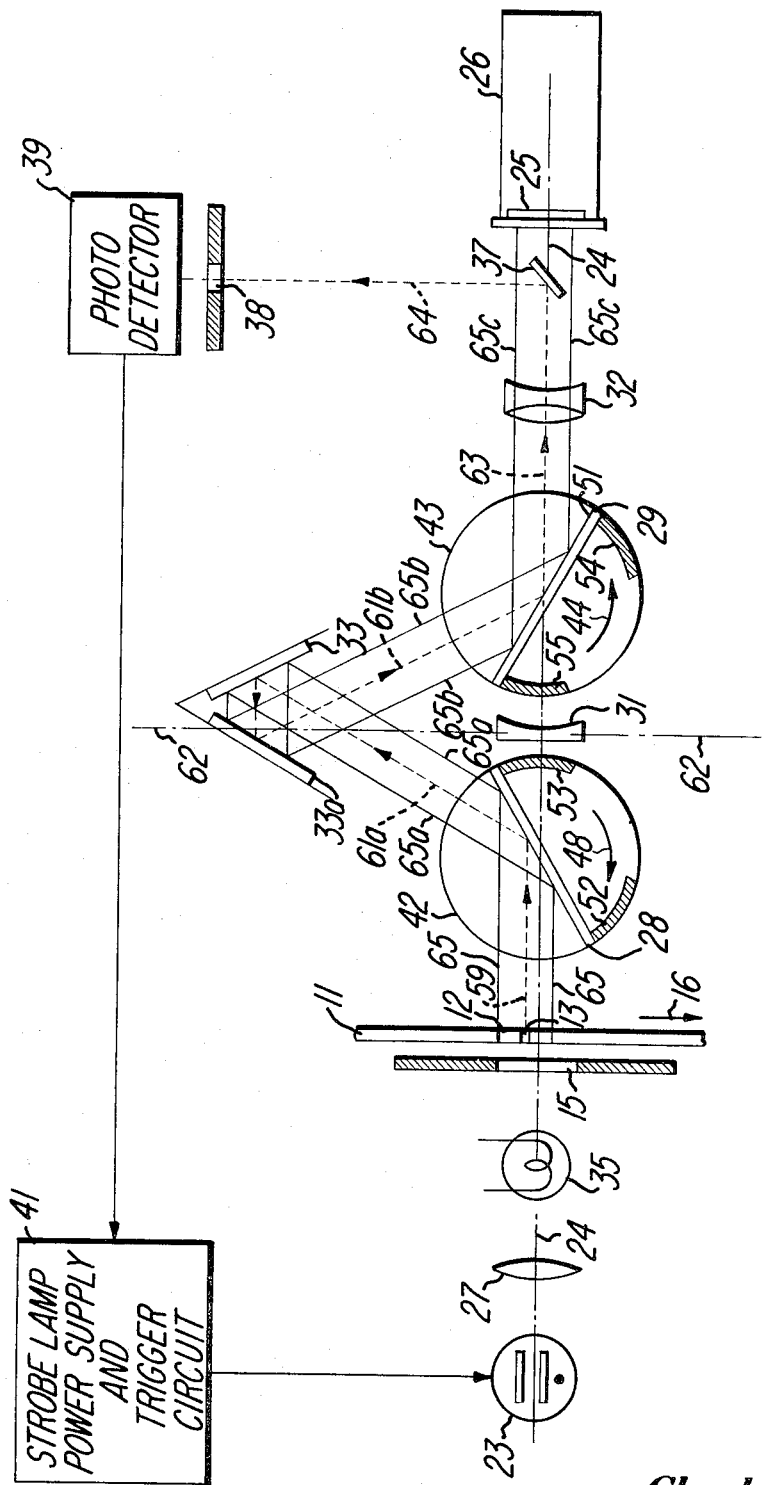

INVENTOR.
Charles D. Boltz, Jr.
BY
Eugene M. Whitacre
ATTORNEY

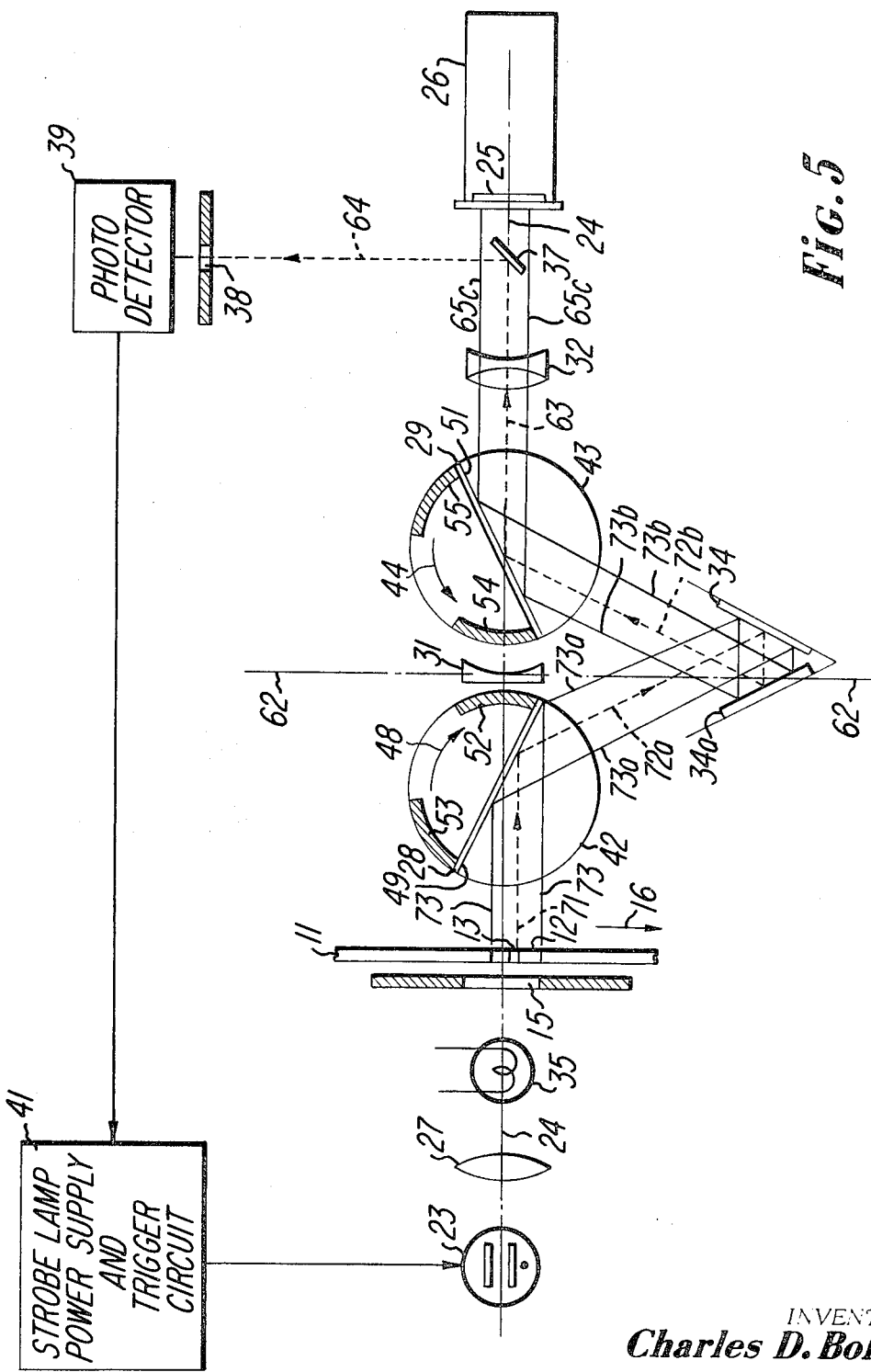

OPTICAL APPARATUS FOR CONTINUOUS TELEVISION FILM PROJECTION SYSTEM

BACKGROUND OF THE INVENTION

In television systems in which a motion picture film is projected onto the photosensitive electrode of a camera tube that is scanned by an electron beam to generate video signals representative of the information recorded in the image-bearing film frames, one of the disadvantages of an intermittent film transport mechanism is the attendant acoustic noise factor. Such unwanted acoustic output of a conventional intermittent film transport mechanism would be particularly objectionable in any system intended for home use to display regular 8 millimeter or "super 8" millimeter film, for example, on a conventional television receiver. Also, a considerable strain is placed upon the film which tends to distort and/or to tear out the sprocket holes and to render more difficult the realization of sufficiently uniform film motion for good sound pickup and reproduction from films having sound tracks.

Continuous motion film transport mechanisms are not subject to such described difficulties encountered with intermittent film transport apparatus, but have their own peculiar problems. Where non-storage types of television camera tubes have been employed, complex and difficult to control optical compensating apparatus has been needed to maintain a light replica of each film frame substantially stationary on the photosensitive camera tube electrode during a complete vertical scanning period. Where storage types of camera tubes are used, however, an intense light replica of a film frame may be projected onto the photosensitive camera tube electrode in the blanking interval between vertical scanning periods. Because the frame rate of the motion picture film generally is slower than the television scanning rate it is necessary to project a plurality of light replicas of each film frame onto the camera tube electrode for scansion a plurality of times. A given film frame, however, will be in different positions in the film gate when the light replica projections are to be made and it is necessary that all projected light replicas be accurately registered on the photosensitive electrode of the camera tube in order to develop properly representative video signals.

Apparatus of the latter type which has been successively operated is disclosed in the copending application of Robert E. Flory, Ser. No. 857,115, filed Sept. 11, 1969 and entitled "Motion Compensating Apparatus for Continuous Television Film Projection System," now U.S. Pat. No. 3,584,148 issued June 8, 1971. Such apparatus includes a rotating mirror system disposed in the optical path between the film and the camera to compensate for the film motion between successive stroboscopic light flashes. The strobe lamp produces light of one color and is triggered into operation in response to the projection of light of another color through the sprocket holes of the film when the rotating mirror system is in the proper positions to project light replicas of the moving film onto the camera tube. The sprocket hole light and that constituting the film light replicas traverse that part of the optical system including the rotating mirror system in opposite directions and are separated by dichroic mirrors to perform their respective functions.

SUMMARY OF THE INVENTION

The apparatus of the present invention, which requires no dichroic mirrors, includes two continuously moving light-forwarding devices in a main optical path between the continuously moving film and the camera tube, each device being partly light transmissive and partly light reflective. It also includes at least one stationary light-reflecting member in a branch optical path at one side of the main optical path. When a given film frame is in one position in the film gate, light therefrom is transmitted through the light-forwarding devices directly along the main optical path to the camera tube. When the frame is in another position in the gate, light therefrom is reflected from a first one of the light-forwarding devices along a branch optical path to the stationary light-reflecting member and from it back to the second light-forwarding device which reflects it to the camera tube in register with the first light replica. The optical apparatus of the invention may also include another stationary light-reflecting member in a second branch optical path on the other side of the main optical path so that, when the film frame is in a third position in the gate, a light replica of the frame is reflected from the first light-forwarding device to the second stationary reflecting member and thence to the second light-forwarding device for further reflection to the camera tube in register with the other two light replicas of the given frame. The light replicas are produced by a strobe lamp which is triggered in response to the detection of light from a continuous source through the sprocket holes of the film when it is in the proper positions in the film gate to have the strobe light projected by the optical system to the camera tube.

For a more specific disclosure of the invention reference may be had to the following detailed description of an illustrative embodiment thereof which is given in conjunction with the accompanying drawings, of which:

FIG. 1 is a fragmentary section of a typical motion picture film which may be used with the invention;

FIG. 2 is a diagrammatic representation of a television film projection system in which a presently preferred form of the optical system comprising the invention is embodied;

FIG. 3 is a diagrammatic showing of the operation of the optical apparatus of the invention when a given film has just entered the film gate;

FIG. 5 is a diagrammatic disclosure of the operation of the film motion compensating apparatus of the invention when the given film frame is about to leave the gate.

DESCRIPTION OF THE INVENTION

Figure 4:
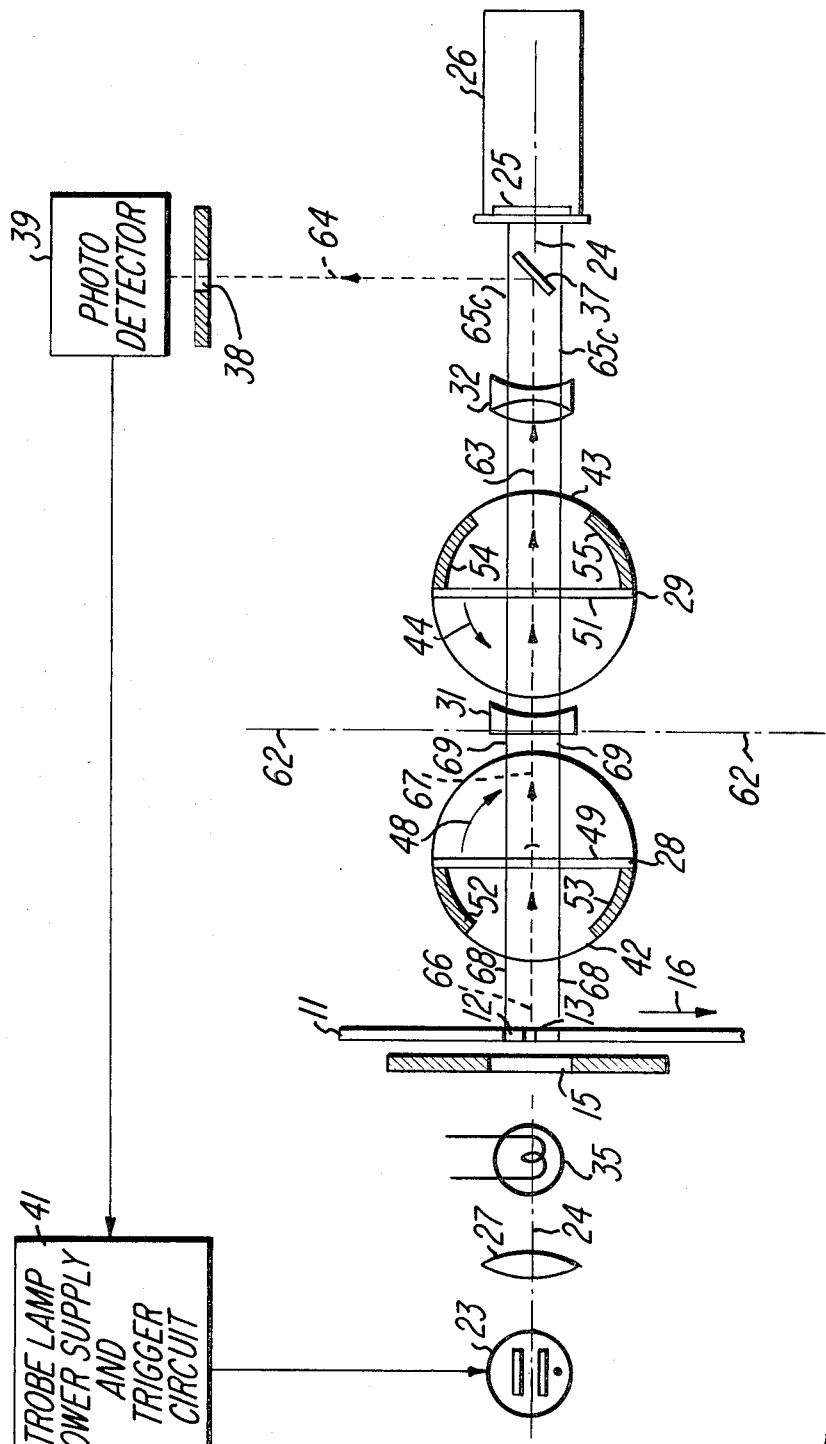
FIG. 4 is a diagrammatic illustration of the operation of the optical apparatus embodying the invention when the given film frame is centered in the gate.

In FIG. 1 an example of the type of film 11 with which the invention may be used has a series of image-bearing frames 12, 12a, 12b, etc., and a series of sprocket holes 13, 13a, 13b, etc., located in a marginal strip 14 adjacent the frames 12, etc. In the illustrated form of the invention the sprocket holes 13, etc., function as the frame position-identifying indicia in a manner to be described subsequently. It should be recognized that additional indicia may also be provided.

In FIG. 2 the motion picture film 11 is moved downwardly continuously through a film gate 15 in the direction of the arrow 16 by any conventional film transport apparatus which, in this case, includes a sprocket wheel 17 that is rotated in the direction of the arrow 18 by a synchronous motor 19 through a reduction gear 21. The motor 19 is energized by a connection to a source of alternating current at terminals 22.

The projection apparatus includes a stroboscopic light source, such as xenon flash lamp 23 which, when actuated, produces s short intense flash of light that is directed along a main optical path 24 to the photosensitive electrode 25 of a vidicon type of camera tube 26. Between the lamp 23 and the camera tube electrode 25 this main optical path 24 includes a collimating lens system 27, the film 11, film motion compensating apparatus (comprising a pair of tandemly arranged movable light-forwarding devices 28 and 29), a path length correcting lens 31 and a relay lens system 32. The film motion compensating apparatus also includes two stationary light-reflecting members 33–33a and 34–34a located respectively in first and second branch optical paths on opposite sides of the main optical path 24.

A continuous light source such as a lamp 35 which is energized by a power supply 36 is located adjacent the main optical path 24 in a position to direct light substantially only through the sprocket holes 13, etc., the film motion compensating apparatus (including the light-forwarding devices 28-29 and the light-reflecting members 33–34) and to a small sprocket hole light-intercepting mirror 37. Light transmitted through the sprocket holes 13, etc., and the film motion compensating apparatus is reflected from the mirror 37 and is directed through a sprocket hole light aperture 38 to a photodetector 39. In response to a pulse of sprocket hole light the photodetector 39 develops a triggering pulse which is impressed upon the trigger circuit and power supply 41 for the momentary actuation of the stroboscopic flash lamp 23.

The light-forwarding devices 28 and 29 are mounted on respective turntables 42 and 43, the latter of which is rotated in the direction of the arrow 44 by the synchronous motor 19 through a reduction gear 45. The respective turn-tables 42 and 43 are provided with intermeshing peripheral gear teeth 46 and 47 so that the turntable 42 is rotated in the direction of the arrow 48. The light-forwarding devices 28 and 29 have respective reflecting surfaces 49 and 51 which reflect approximately one-half of the light from the lamps 23 and 35 striking them, the other half of the impinging light being transmitted through the devices. Opaque shutters 52–53 and 54–55 are provided respectively with the light-forwarding devices 28 and 29 to prevent the transmission of light along the entire length of the main optical path 24 at certain stages of the operation of the film motion compensating apparatus to be described presently.

In the film projection system of FIG. 2 the film 11 is continuously advanced through the gate 15 at the rate of 20 frames per second and the photosensitive electrode 25 of the camera tube 26 is scanned by an electron beam (not shown) under the control of a deflection yoke 56, energized by a conventional deflection wave generator 57 at, for example, the United States standard television rate of 60 fields per second. Hence, three light replicas of each image-bearing frame of the film are projected during vertical blanking intervals successively onto the camera tube electrode 25 for respective scansions during three successive television field periods. In order to accomplish such projection the sprocket wheel 17, which is provided with 10 sprocket hole engaging teeth 58, is rotated at 120 R.P.M. and the light-forwarding devices 28 and 29 are rotated at 1,200 R.P.M. In the following description of the operation of the film motion compensating apparatus of the invention the passage of a typical film frame 12 through the gate 15 will be discussed. In such apparatus the gate has a height that is 1 ⅔ of the height or vertical dimension of a film frame.

In FIG. 3 the optical film motion compensating apparatus is shown in its proper position to project upon the photosensitive electrode 25 of the camera tube 26 a typical film frame 12 just as it is transported to be wholly within the gate 15. This instant occurs during a vertical blanking interval and at the same time that the light-forwarding devices 28 and 29 are in the positions shown. The semi-reflecting surfaces 49 and 51 of the respective devices are facing upwardly at substantially 120° angles to the main optical path 24 so that light through the sprocket hole 13, that is transmitted along the broken line path 59 above and parallel to the main optical path 24, is reflected along a broken line segment 61a of a first branch optical path to the stationary light-reflecting member 33–33a and thence along a broken line segment 61b of the first branch optical path to the semi-reflecting surface 51 of the light-forwarding device 29. The reflector surfaces of the light-reflecting member 33—33a face one another at 60° angles to the main optical path 24 and the member is positioned slightly on the camera tube 26 side of the median line 62 between the light-forwarding devices 28 and 29. By such an arrangement the branch optical path segment 61b meets the semi-reflecting surface 51 at the main optical path 24. Thus, from the light-forwarding device 29 the sprocket hole light follows an optical path 63 coinciding with the main optical path 24 to the mirror 37 from which it is reflected along the broken line path 64 for transmission through the sprocket hole aperture 38 to the photodetector 39. The resultant actuation of the stroboscopic lamp 23 causes the projection upon the photosensitive electrode 25 of the camera tube 26 of a momentary light replica of the film frame 12 along an optical route centered about the broken line optical path 59–61a–61b–63 and indicated by the solid lines 65–65a-65b–65c.

Any light from either the image-bearing film frame 12 or the sprocket hole 13 that is transmitted through the light-forwarding device 28 because of its semi-transparency is prevented from reaching the light-forwarding device 29 by the opaque shutters 53 and 55. It will be observed that the single shutter 53 would suffice for such purpose but it is advantageous to fabricate both light-forwarding members 28 and 29 alike so that manufacturing economies may be realized and so that the two members may be interchangeably used in the system.

FIG. 4 shows the respective positions of the typical film frame 12 and the light-forwarding devices 28 and 29 one-sixtieth of a second later during the next vertical blanking interval. The frame 12 is centered vertically in the gate 15 and the light-forwarding devices 28 and 29 are at right angles to the main optical path 24 with their respective reflecting surfaces 49 and 51 facing one another. Light from the lamp 35 through the sprocket hole 13 follows the broken line path 66, which coincides vertically with the main optical path 24, through the light-forwarding device 28, along the broken line path 67, and through the path length correcting lens 31 and the light-forwarding device 29 from which it emerges along the broken line path 63 for reflection by the mirror 37 along the broken line path 64 to the photodetector 39. In a similar manner the momentary light replica of the frame 12 produced by the actuation of the flash lamp 23 follows an optical route indicated by the solid lines 68–69–65c through the light-forwarding devices 28 and 29 and the lenses 31 and 32 to the photosensitive electrode 25 of the camera tube 26. Because the optical route segment 65c of FIG. 4 is identical to the corresponding route 65c of FIG. 3 the light replica of the frame 12 are projected onto the camera tube 26 in identical positions. The optical path length correcting lens 31 effectively lengthens the respective optical paths 67 and 69 to be substantially equivalent optically to the branch paths 61a–6b and 65a–65b of FIG. 3.

In FIG. 5 the typical film frame 12 is shown in its position one-sixtieth of a second later during the next vertical blanking interval just as it is about to be transported out of the gate 15. The light-forwarding devices 28 and 29 are at 120° angles to the main optical path 24 with their respective reflecting surfaces 49 and 51 facing downwardly. Light from the lamp 35 that is transmitted through the sprocket hole 13 follows a broken line path 71 which is parallel to and below the main optical path 24 and is reflected by the surface 49 along a second branch optical path 72a to the stationary reflecting member 34–34a. The reflectors 34 and 34a face one another at 60° angles to the main optical path 24 and the member is located slightly on the camera tube 26 side of the median line 62. Thus, the stationary reflecting member 34–34a redirects the sprocket hole light along the broken line segment 72b of the second branch optical path to the reflecting surface of the light-forwarding device 29, from which it is reflected along the path 63 followed by similar light in the two previously described operating stages of the film motion compensating apparatus of the invention shown in FIGS. 3 and 4. Also, in a manner similar to that described with reference to FIG. 3 the light replica of the film frame 12 follows the route depicted by the solid lines 73 and is reflected from the light-forwarding device 28 along the solid lines 73a to the stationary reflecting member 34–34a and from it along the solid lines 73b to the light-forwarding device 29 from which it is projected by the lens 32 along the solid lines 65c to the camera tube 26. Again it is seen that this light replica of the frame 12 impinges upon the camera tube photosensitive electrode 25 in precise register with the light replicas of this frame produced by the apparatus of the invention in the positions shown in FIGS. 3 and 4. In the FIG. 5 position the transmission of light along the entire length of the main optical path 24 is prevented by the opaque shutters 52 and 54.

It is to be noted that only the light transmitted through the sprocket hole 13 which emerges from the light-forwarding device 29 along the optical path 63 is effective to cause the photodetector 39 to actuate the trigger circuit 41 for the stroboscopic flash lamp 23. This is insured by the respective positions of the mirror 37 and the sprocket hole light aperture 38. As the film 11 and the light-forwarding devices 28 and 29 are being moved from one to another of the positions shown in FIGS. 3, 4 and 5 sprocket hole light is being forwarded in the general direction of the camera tube 26 by the film motion compensating apparatus of the invention, either by direct transmission through the devices 28 and 29 or by reflection from the stationary reflecting members 33–33a and 34–34a. It is the function of the aperture 38 to transmit to the photodetector 39 only that sprocket hole light that reaches the mirror 37 by way of the optical path denoted by the broken line 63. All other light is excluded from the aperture 38 so that the photodetector 39, and hence the stroboscopic lamp 23, respond only when the film frame 12 and the film motion compensating apparatus are in one of the positions shown in FIGS. 3, 4 and 5.

An important advantage of the film motion compensating apparatus of the invention is that the components thereof need not be fabricated with an exceedingly high degree of precision. Instead, the high precision required in the operation of the apparatus is easily attainable by suitable adjustment of the components after assembly.

As used in the foregoing specification and in the following claims, the term "image-bearing frame" is defined as one in which there is a photographic record of an object or scene such as a true positive or negative, black and white or color image or an encoded representation thereof as, for example, in systems such as in U. S. Pat. No. 2,733,291 granted Jan. 31, 1956 to R. D. Kell and in U. S. Pat. No. 3,378,633 granted Apr. 16, 1968 to A. Macovski where the component color information is spatially encoded on black and white film.

In such patented systems the color encoding is in the form of a fine structure of color representative strips which are oriented vertically and/or at one or more angles to the horizontal dimension of the film frames. The projection of the light replicas of such a strip structure onto the photosensitive camera tube electrode 25 and its scansion by an electron beam develop video signals in the output of the camera tube 25 which include the component color information as amplitude modulations of a plurality of relatively high frequency carrier waves.

What is claimed is:

1. In a television film projection system, motion compensating apparatus for precisely positioning in substantially the same place on a storage type photosensitive electrode of a camera tube during respective vertical blanking intervals a plurality of momentary light replicas of each of a series of image-bearing frames of a motion picture film being continuously moved in the longitudinal dimension thereof past a film gate, said light replicas being produced by light from a stroboscopic light source momentarily actuated by the detection of frame position-identifying indicia in a marginal strip of said film adjacent each of said image-bearing frames, said film motion compensating apparatus comprising:

first and second light-forwarding devices in a main optical path between said film and said camera tube, each of said devices being partly light transmissive and partly light reflective;

at least a first stationary light-reflecting member positioned in a first branch optical path on one side of said main optical path; and means for continuously moving said first and second light-forwarding devices so as to transmit light from a given film frame in a first position in said gate directly along the entire length of said main optical path to said camera tube, and to reflect light form said given film frame in a second position in said gate from said first light-forwarding device to said first light-reflecting member, and thence to said second light-forwarding for reflection therefrom to said camera tube.

2. In a continuously moving television film projection system, film motion compensating apparatus as defined in claim 1, wherein:

a second stationary light-reflecting member is positioned in a second branch optical path on the opposite side of said main optical path from said first branch optical path; and said first and second light-forwarding devices being movable to reflect light from said given film frame in a third position in said gate from said first light-forwarding device to said second light-reflecting member, and thence to said second light-forwarding device for reflection therefrom to said camera tube.

3. In a continuously moving television film projection system, film motion compensating apparatus as defined in claim 2, wherein:

said first and second light-forwarding devices are tandemly arranged in said main optical path and are oppositely rotatable about respective axes parallel to the transverse dimension of said film.

4. In a continuously moving television film projection system, film motion compensating apparatus as defined in claim 3, wherein;

each of said first and second light-reflecting members comprises first and second mirrors angularly positioned relative to one another and to said main optical path so that said first mirror receives light reflected from said first light-forwarding device and reflects it to said second mirror which reflects it to said second light-forwarding device.

5. In a continuously moving television film projection system, film motion compensating apparatus as defined in claim 4, wherein:

each of said first and second light-forwarding devices includes light shutters positioned so as to prevent light from said given film frame from being transmitted directly to said camera tube when said light-forwarding devices are operative to reflect light from said given film frame in said second and third positions thereof in said gate.

6. In a continuously moving television film projection system, film motion compensating apparatus as defined in claim 5, wherein:

said main optical path includes a lens to compensate for the longer light paths from said film to said camera tube through said first and second branch optical paths.

7. In a continuously moving television film projection system, film motion compensating apparatus as defined in claim 6, wherein:

said first and second light-forwarding devices are geared together and are driven to make one revolution for the travel of each film frame through said gate.

8. In a continuously moving television film projection system, film motion compensating apparatus as defined in claim 7, wherein:

said film frame position-identifying indicia comprise one sprocket hole for each image-bearing frame;

a source of continuous illumination for said sprocket holes; and means responsive to light through each of said sprocket holes when each of said film frames is in said first, second and third positions in said gate to momentarily actuate said stroboscopic light source to produce light replicas of said image-bearing film frames for forwarding to said camera tube.

9. In a continuously moving television film projection system, film motion compensating apparatus as defined in claim 8, wherein:

said sprocket hole light responsive means includes a sprocket hole light-intercepting mirror positioned between said light-forwarding devices and said camera tube to divert said sprocket hole light to a photodetector for the production of a triggering pulse to actuate said stroboscopic light source.

10. In a continuously moving television film projection system, film motion compensating apparatus as defined in claim 9 wherein:
said sprocket hole light responsive means also includes an aperture positioned between said intercepting mirror and said photodetector to admit sprocket hole light to said photodetector only when said light-forwarding devices are operative to forward light from said film frame in any of said first, second and third positions thereof in said gate.

* * * * *